Figure 1:
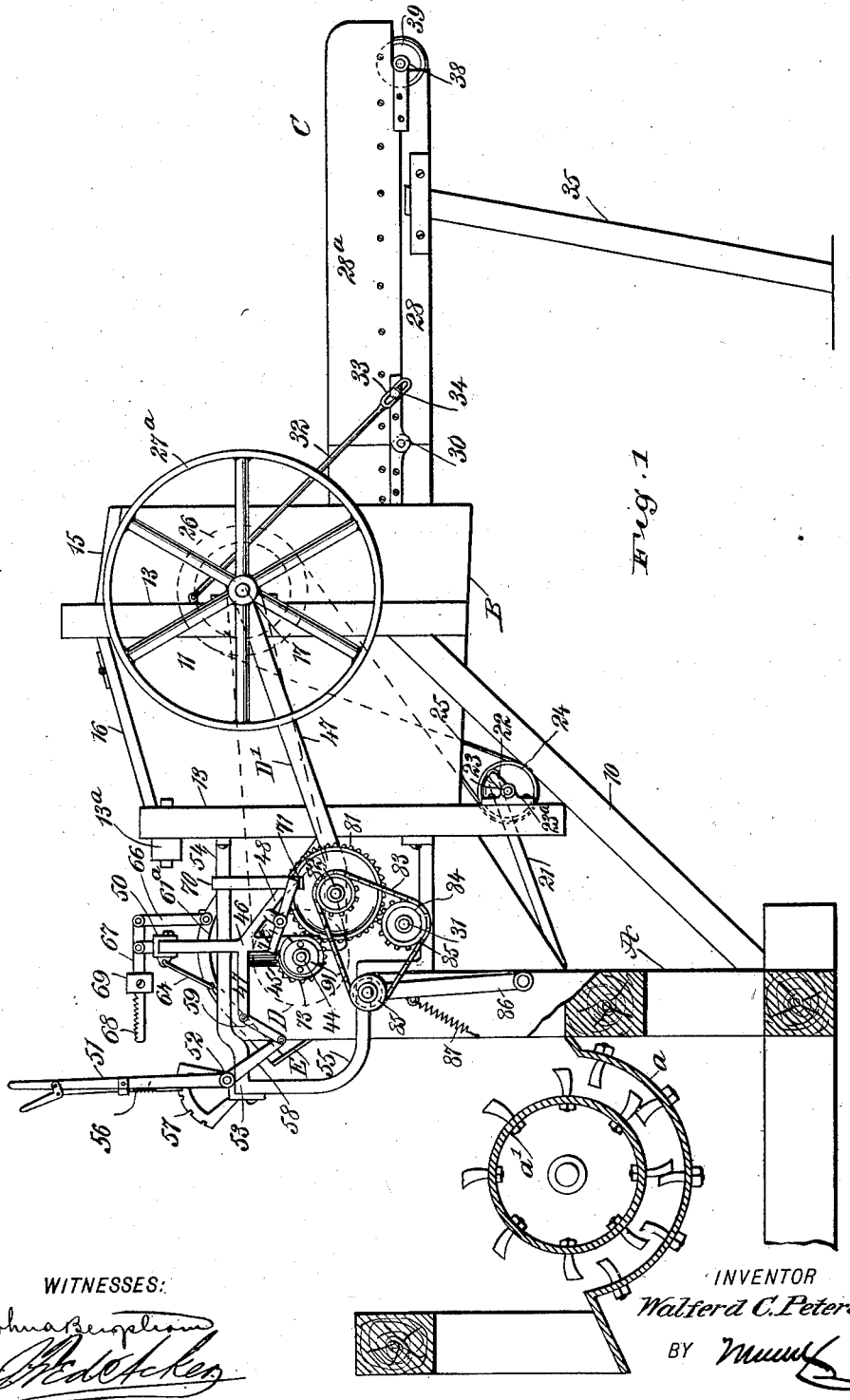

No. 749,629. PATENTED JAN. 12, 1904.
W. C. PETERSON.
GOVERNOR FOR FEEDERS OF THRESHING MACHINES.
APPLICATION FILED JULY 18, 1902.
NO MODEL. 4 SHEETS—SHEET 1.

WITNESSES:

INVENTOR
Walferd C. Peterson
BY
ATTORNEYS.

No. 749,629. PATENTED JAN. 12, 1904.
W. C. PETERSON.
GOVERNOR FOR FEEDERS OF THRESHING MACHINES.
APPLICATION FILED JULY 18, 1902.
NO MODEL. 4 SHEETS—SHEET 2.
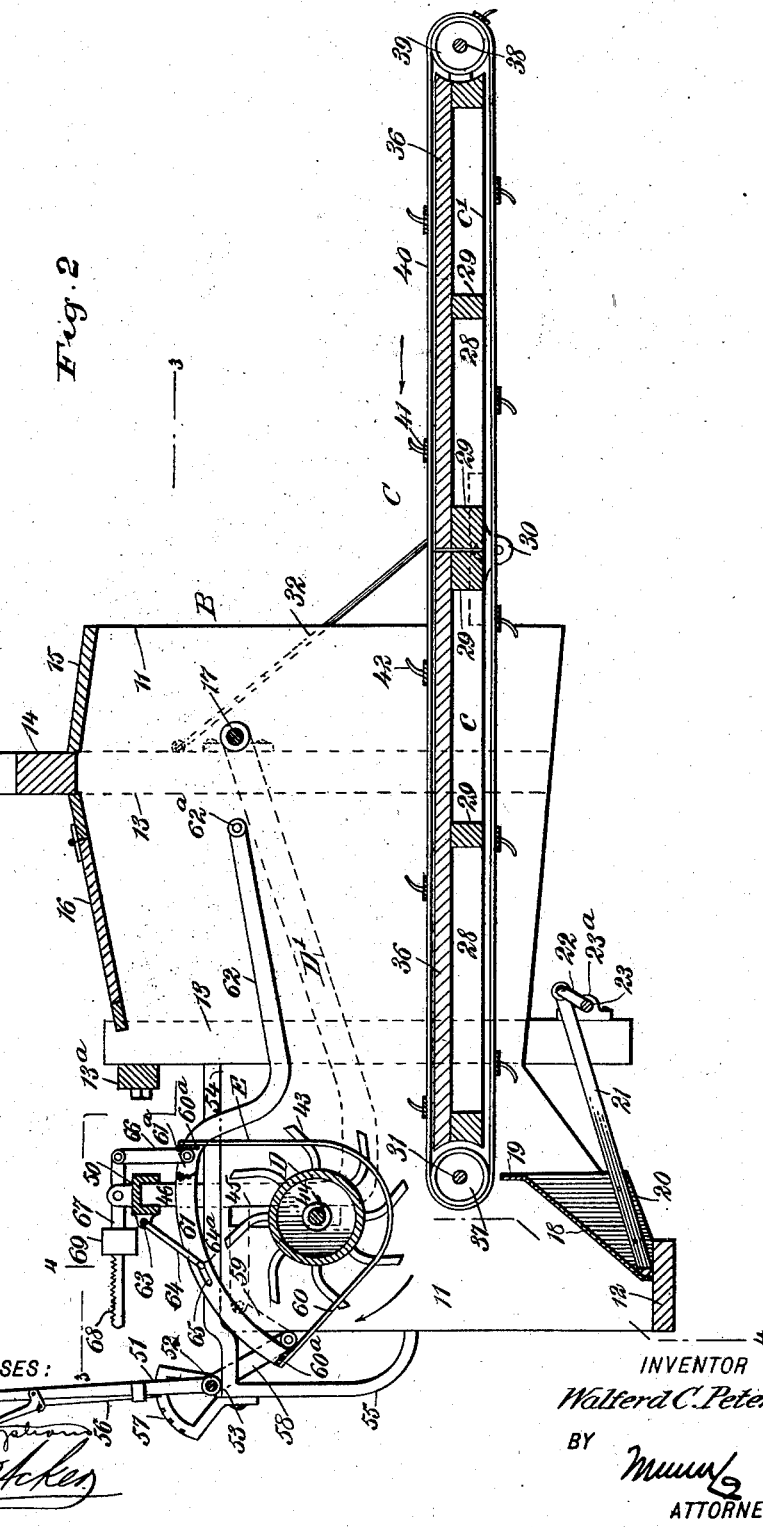
WITNESSES:
INVENTOR
Walferd C. Peterson
BY
ATTORNEYS No. 749,629. PATENTED JAN. 12, 1904.
W. C. PETERSON.
GOVERNOR FOR FEEDERS OF THRESHING MACHINES.
APPLICATION FILED JULY 18, 1902.
NO MODEL. 4 SHEETS—SHEET 3.
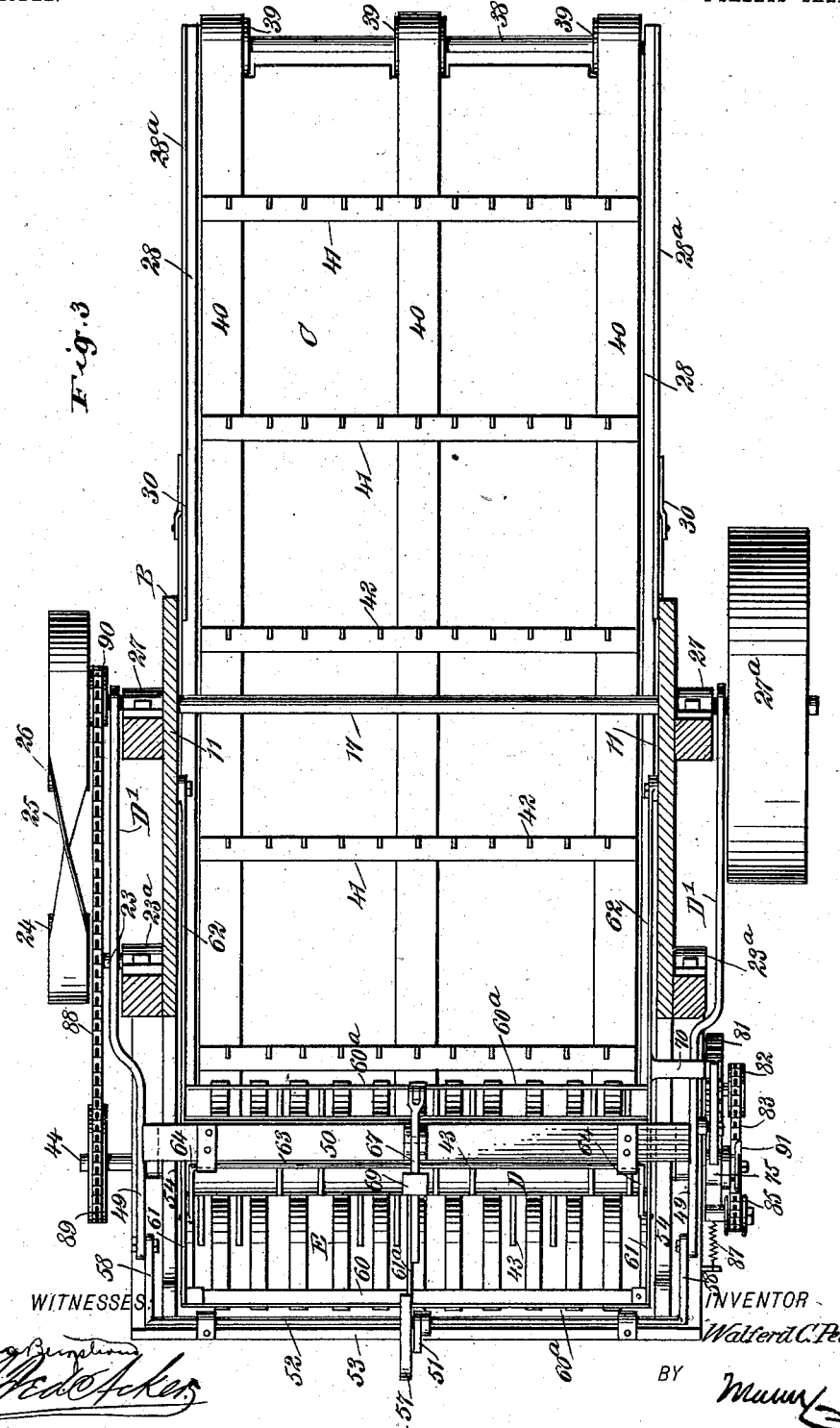

No. 749,629. PATENTED JAN. 12, 1904.
W. C. PETERSON.
GOVERNOR FOR FEEDERS OF THRESHING MACHINES.
APPLICATION FILED JULY 18, 1902.
NO MODEL. 4 SHEETS—SHEET 4.
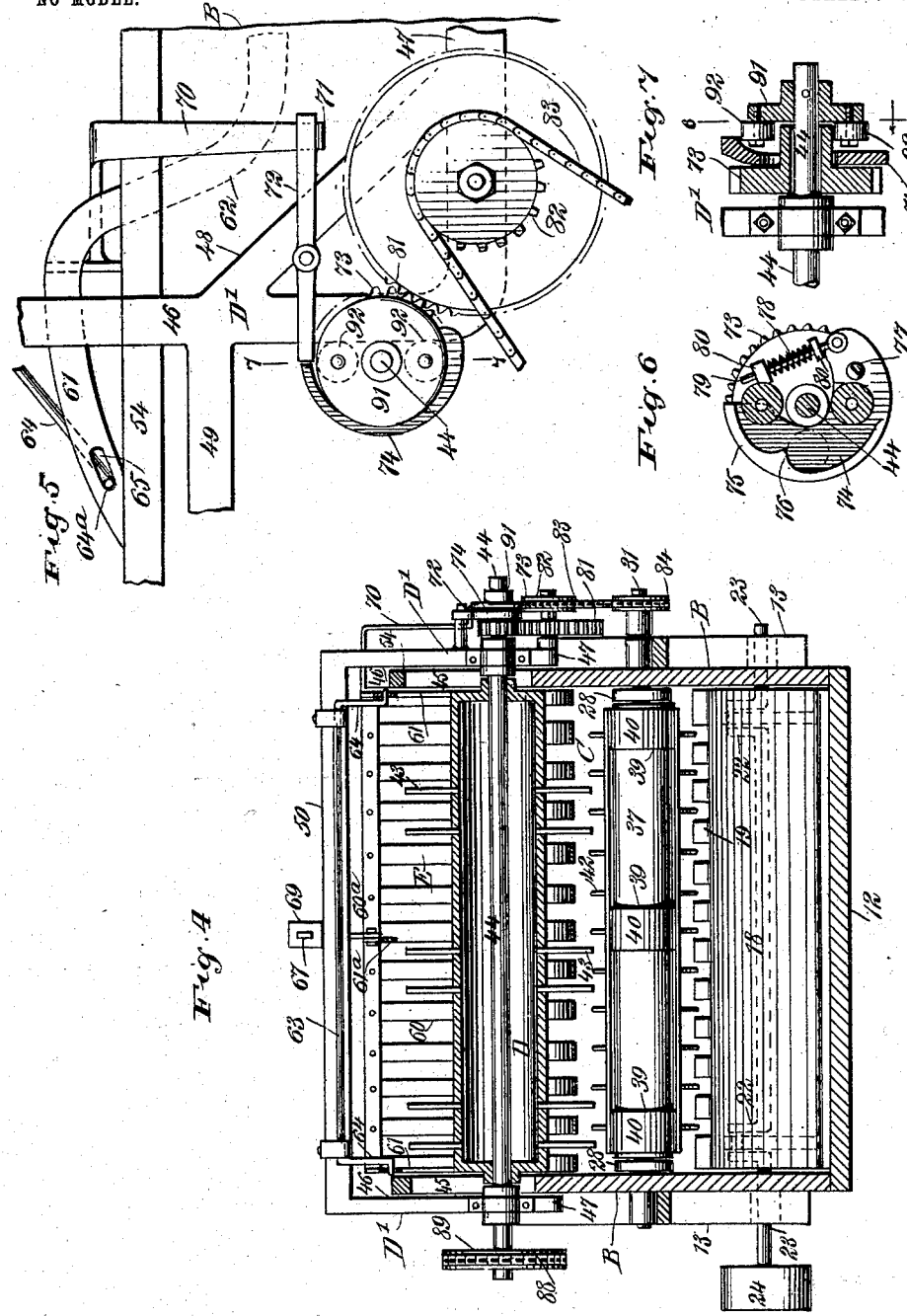
WITNESSES:
INVENTOR
Walferd C. Peterson
BY
ATTORNEYS.

No. 749,629. Patented January 12, 1904.

UNITED STATES PATENT OFFICE.

WALFERD C. PETERSON, OF GENEVA, NEBRASKA, ASSIGNOR OF ONE-HALF TO FRANKLIN SKIPTON, OF GENEVA, NEBRASKA.

GOVERNOR FOR FEEDERS OF THRESHING-MACHINES.

SPECIFICATION forming part of Letters Patent No. 749,629, dated January 12, 1904.

Application filed July 18, 1902. Serial No. 116,076. (No model.)

*To all whom it may concern:*

Be it known that I, WALFERD C. PETERSON, a citizen of the United States, and a resident of Geneva, in the county of Fillmore and State of Nebraska, have invented a new and useful Improvement in Governors for the Feeders of Threshing-Machines, of which the following is a full, clear, and exact description.

The purpose of the invention is to provide an adjustable bundle-carrier so constructed that it can be folded under the feeder when desired and a feed-roller and shield for the same by means of which the amount of grain being fed to the cylinder is regulated and controlled automatically after the amount of pressure required to raise the shield has been determined upon.

Another purpose of the invention is to provide means to stop the bundle-carrier automatically when a surplus of grain is being fed to the cylinder and set the bundle-carrier in motion automatically the moment the surplus grain has been disposed of.

A further purpose of the invention is to provide supports for the bundle-carrier so constructed that the bundle-carrier may be brought into any desired proximity to the band-cutting knives, thus adapting it to large or small bundles, and to provide such means for suspending the shield that it will always be held level no matter at what point pressure is brought to bear on the shield to raise it.

Another purpose of the invention is to provide a mechanism whereby when the carrier is stopped the feed-roller will continue to feed and will feed just the same as when the carrier is in motion, except that it will feed a little more grain when the carrier is stopped by reason of the teeth of the feed-roller at such time projecting farther below the shield, thus enabling them to take up more grain. Perfect adjustability is claimed for the bundle-carrier to accommodate large or small bundles, and adjustability of the shield is also claimed to allow a greater or less amount of grain to be carried to the cylinder, together with adjustability of pressure required to raise the shield.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the attachment and a vertical section through the concave and cylinder. Fig. 2 is a vertical longitudinal section through the attachment, the section being centrally taken. Fig. 3 is a horizontal section taken practically on the line 3 3 of Fig. 2. Fig. 4 is a vertical section taken practically on the line 4 4 of Fig. 2. Fig. 5 is a side elevation of a portion of the attachment, drawn upon a larger scale, and a side elevation of the shifting device for effecting a stoppage of the bundle-carrier when the feed of straw is in excess of the power of the feed-roller to dispose of. Fig. 6 is a section through the shifting device, the section being taken on the line 6 6 of Fig. 7; and Fig. 7 is a vertical section through the said shifting device, taken practically on the line 7 7 of Fig. 5.

A represents a portion of a threshing-machine containing a concave $a$ and cylinder $a'$, and B represents the frame of the attachment, which is so applied to the frame A of the threshing-machine that the material passing through the attachment will be delivered to the concave and the cylinder. The said frame B of the attachment is shown as supported by braces 10, although other means for attachment to the threshing-machine frame may be provided.

The frame B of the attachment consists of opposing side sections 11, which are preferably higher at the outer portion of the frame than at the inner portion of the frame where the frame connects with the threshing-machine, as is illustrated in Figs. 1 and 2, and the side sections 11 of the frame are provided with suitable exterior vertical posts or braces 13. At the lower inner portion of the frame B the side sections are connected by a cross-bar 12. (Shown in Figs. 2 and 4.) A top cross-beam 14 connects opposing side beams or braces 13, and other front brace-beams 13$^a$ may be employed, if desired. The top 15, which is provided for the higher outer portion of the frame, has a door 16 made therein in order that ready access may be gained to a shaft 17, which extends through the side sections 11 of the frame near the receiving or outer end of the said section, and said shaft 17 is adapted to carry band-cutters of any suitable construction.

Just above the lower inner cross bar or sill 12 a push-feed 18 is located adapted to carry the straw from the straw-carrier C, to be hereinafter described, to the concave and cylinder. This push-feed 18 has horizontal movement to and from the concave and cylinder and is constructed with an upwardly and outwardly beveled front face, upper front vertical teeth 19, and side wings 20, as is shown in Figs. 2 and 4. Connecting-rods 21 are securely fastened to the wings 20 of the push-feed 18, and these connecting-rods 21 are also pivotally mounted on the crank-arms 22 of a crank-shaft 23, mounted to turn in suitable bearings $23^a$, preferably located at the lower ends of the forward uprights or brace-beams of the frame B, as is shown in Figs. 1 and 2.

At preferably the left-hand end of the crank-shaft 23 a pulley 24 is secured, and this pulley 24 is connected by a cross-belt 25 with a pulley 26 on the left-hand end of the band-cutter shaft 17, which shaft is journaled in suitable bearings 27, secured to the outer faces of the side sections 11 of the frame B, as is shown in Fig. 3, and at the right-hand end of the band-cutter shaft 17 a driving-pulley $27^a$ is secured.

The bundle-carrier C, above referred to, is preferably made in two sections $c$ and $c'$, although it may be made in three or more sections, if desired. The two sections $c$ and $c'$ illustrated are located one within the frame B and the other without the said frame, extending beyond the receiving end of the frame. Each of the said sections consists of two side pieces 28, to which upper extensions $28^a$ may be added, and cross bars or beams 29, located at suitable intervals apart. The two sections $c$ and $c'$ are connected by hinges 30, the hinges being of such construction that the outer section $c'$ may fold down beneath the inner section $c$, since the bottom portion of the frame B is open. The bundle-carrier C is pivoted at the inner end of its inner section $c$ at the inner portion of the frame B at a point practically above the push-feed 18, as is shown in Fig. 2. Such pivotal connection with the frame is brought about through the medium of a shaft 31, which extends through from side to side of the frame B, being provided with suitable bearings. The outer section $c'$ of the bundle-carrier C is adjustably supported, preferably by means of links 32, which are pivoted at their upper ends to the outer posts or braces 13, as is shown in Figs. 1 and 2, and said links 32 are provided with elongated loops 33 at their lower ends, loosely receiving pins 34, which are securely fastened in the sides of the outer section $c'$ of the bundle-carrier, and either the upper ends of the links 32 may be detachable from the supporting posts or braces 13 or the pins 34 may be made removable from the carrier-section $c'$ to enable the said section to be folded down beneath the inner section.

The outer portion of the bundle-carrier C is mainly supported either in a horizontal or in an inclined position by means of legs 35, adjustably secured to the outer section $c'$, which legs are adapted to rest on the ground or other suitable support. The construction of each section $c$ and $c'$ of the bundle-carrier C is completed by the addition of a bottom board 36, which is supported by the cross-beams 29, as is best shown in Fig. 2, and on the shaft 31 a drum or roller 37 is firmly secured. At the outer end of the outer section $c'$ a shaft 38 is mounted in suitable bearings, and said shaft 38 has two or more, preferably three, rollers 39 secured thereon, one near each end and one at the center, as is shown in Fig. 3. Endless belts 40 are passed over the rollers 39 and over the drum 37, and said belts 40 are connected by transverse strips 41, usually made of metal, which connecting-strips 41 are provided with teeth 42, arranged in longitudinal series, and said teeth are curved, the upper teeth facing outwardly and the lower teeth in an inward direction, as is shown in Fig. 2.

A feed-roller D is located within the main frame or casing B above the inner or delivery end of the bundle-carrier C, as is particularly shown in Fig. 2. This feed-roller D is provided with teeth 43, which teeth are preferably curved in such manner that their convexed surfaces face the direction of rotation of the roller. These teeth are preferably staggered in pairs on the roller, as is shown in Figs. 3 and 4. The shaft 44 of the feed-roller D extends through vertical openings 45, made in the sides of the main frame or casing B, as is shown in Figs. 1 and 2, and is journaled in bearings attached to the vertical members 46 of angular supporting-arms D', located at the outside of the said casing or frame B. The vertical members 46 of said supporting-arms D' extend above the upper edge of the frame or casing, as is shown in Fig. 1, while the other members 47 of the said angular supporting-arms D' extend from the vertical members 46 at a point below the bearings for the shaft 44 in direction of the receiving end of the frame or casing. The said members 47 are preferably pivoted on the outer ends of the band-cutter shaft 17. Each supporting-arm D' has its members 46 and 47 connected by a diagonal bar 48, and from the vertical members 46 of the said arms D' at a point above the feed-roller D horizontal arms 49 are extended in direction of the end of the casing or frame B to be attached to the threshing-machine.

The supporting-arms D' are adapted to be raised and lowered, and when raised they carry the feed-roller D sufficiently away from the bundle-carrier C to have no action on the material fed by the said bundle-carrier. The arms D' are moved to adjust the feed-roller D through the medium of a lever 51, which is secured about centrally to a shaft 52, journaled in suitable bearings on the outer or end bar 53 of a skeleton frame, which end bar is located at the end of the frame or casing B, adapted to face the threshing-machine, and is held some distance out from the said end of the frame or casing by side bars 54, which are preferably carried along the upper edges of the reduced portions of the side sections 11 of the said frame B, as is shown in Figs. 1 and 2. The skeleton frame above referred to is supported also at its outer end by bracket-sections 55, which are carried downward and horizontally along the outer faces of the side members 11 of the frame or casing B, as is shown in Fig. 1.

The upper portions of the vertical members 46 of the supporting-arms D' are connected by an upper cross-bar 50, and the lever 51 is provided with a suitable thumb-latch 56, adapted for engagement with a rack 57, secured to the outer end bar 53 of the said skeleton frame. The shaft 52, on which the lever 51 is secured, is provided with a downwardly-extending crank-arm 58 at each end, and these crank-arms are pivotally connected by links 59 with the horizontal projections 49 from the supporting-arms D' of the feed-roller D, so that by moving the lever 51 forward or rearward the feed-roller D may be raised or lowered to the extent of the length of the slots 45, and through the medium of the thumb-latch 56 and rack 57 said feed-roller can be held in its adjusted position.

The feed-roller D turns within a shield E. This shield is of basket shape, its front being straight, its bottom curved, and its rear more or less inclined downwardly. The inclined portion of the basket shield is that which faces the threshing-machine when the attachment is applied thereto. This basket shield is preferably made of metal and consists of a series of properly-bent transverse slats 60, attached at their upper ends to horizontal bars 60$^a$. The ends of the basket shield are open and are quite close to the inner faces of the side sections of the frame or casing B, and at each end of the basket shield E an upwardly-arched cross-bar 61 is formed extending from front to rear, and an extension 62 of each arched cross-bar 61 is carried downward and in direction of the receiving end of the frame or casing B and is pivoted to the sides of the said frame or casing, as is shown at 62$^a$ in Fig. 2. Thus the said basket shield has a pivotal support on the frame or casing B; but the burden of the support of said basket shield E is sustained by a shaft 63, journaled in suitable bearings carried at the upper cross-bar 50 of the supporting-arms for the feed-roller D. The said shaft 63 is provided with crank-arms 64, extending downward from its ends, the said crank-arms being provided with horizontal extensions 64$^a$ at their free ends, as is best shown in Fig. 5, which extensions 64$^a$ enter slots 65, produced in the end cross-bars 61 of the basket shield E, enabling the basket shield to be additionally raised no matter at what point at its bottom upward pressure may be exerted thereon. This basket shield is adapted to control the amount of material delivered by the bundle-carrier C to the feed-roller D, and in order to graduate the quantity of material as it is delivered to the feed-roller D the basket shield will be raised sufficiently to permit the surplus material to more conveniently pass between the shield and the bundle-carrier, and as the feed-roller D remains at that time in its lower position the teeth of the feed-roller extending out through the openings between the slats of the shield will extend farther out than usual and at each operation will remove a much greater quantity of material from the bundle-carrier. If the pressure is too great at the bottom portion of the shield, the feed-roller will be raised upward with the shield, and when the shield is carried up beyond a predetermined height the driving mechanism of the bundle-carrier is checked, and the said bundle-carrier will cease to feed until the surplus material has been removed from beneath the shield, and the shield thereupon dropping will automatically set the driving mechanism for the bundle-carrier for further operation. Mechanism to this end is to be hereinafter described.

It may here be stated that in addition to the end-arched cross-bars 61 for the basket shield E a third and centrally-located cross-bar 61$^a$ is also employed. A link 66 is pivoted to the central cross-bar 61$^a$ at the rear of the basket shield, and this link 66 is pivotally attached to a regulating-arm 67, fulcrumed on the connecting-bar 50 of the supporting-arms D' for the feed-roller. This regulating-bar is provided with notches 68, adapted to receive a projection from a weight 69, mounted to slide on the regulating-bar 67. By setting the weight outward or inward on the regulating-bar the amount of pressure necessary to be overcome before the shield can be raised is accurately calculated and regulated.

A trip-arm 70 is attached to the right-hand extension 62 of the right-hand arched cross-bar 61 of the basket shield, and this trip-arm extends horizontally outward and thence downward at the right-hand side of the frame or casing B, terminating at its lower edge in a horizontal foot 71, on which foot the longer and heavier end of a lever 72 normally rests, which lever is fulcrumed between its ends on a post or other support shown attached to the diagonal brace-bar 48 for the right-hand supporting-arm D' of the feed-roller D. This lever 72 is a trip-lever, and when the basket shield is raised is adapted to stop the rotation of the drive-shaft of the bundle-carrier C. This lever 72 acts in connection with a gear-wheel 73, loosely mounted on the right-hand end of the shaft 44 of the feed-roller D, as is shown best in Fig. 7, and a crescent-shaped arm 74 is carried by the gear 73, being pivoted on the said gear near one of its ends by a pin 77, as is shown in Fig. 6. At the outer marginal portion of said crescent or segmental arm 74 a segmental flange 75 is formed, which extends from a point near its pivot to the opposite end of the arm. The flange 75 is provided between its ends with an inwardly-projecting angular projection 76, forming pockets at each side of the said projection. The flange portion of the crescent arm 74 is held normally within the line of teeth of the gear 73 by a spring 78, which is coiled around a rod 79, pivoted to the pivotal end of the said crescent arm 74 and held to slide between bearings 80, secured to the said gear 73, as is also shown in Fig. 6.

The gear 73 meshes with a large idle gear 81, mounted to turn on a short axle carried by the right-hand supporting-arm D' for the feed-roller D, as is particularly shown in Fig. 5. This gear 81 has a sprocket-wheel 82 attached, over which sprocket-wheel a chain belt 83 is passed. The said chain belt is carried over a sprocket-wheel 84, attached to the drive-shaft 31 for the bundle-carrier C, and the said chain belt 83 is further carried over a tension-pulley 85, carried by an arm 86, pivoted to the frame, which arm is normally drawn outward or in direction of the inner end of the main frame or casing B by a spring 87, as is also shown in Fig. 1.

The shaft 44 of the feed-roller D is driven by a chain belt 88, which passes over a sprocket-wheel 89, secured to the said shaft 44, and over a like wheel 90, secured to the band-cutter shaft 17, which is the driving-shaft of the attachment.

Motion is communicated to the drive-shaft 31 of the bundle-carrier C when the basket shield is in its lower position by means of a clutch-disk 91, which clutch-disk is secured upon the right-hand end of the shaft 44 and is provided with diametrically opposite rollers 92, adapted to enter either one of the pockets formed in the flange 75 of the crescent arm 74, and the roller thus entering, as is shown in dotted lines in Fig. 6, will be held in frictional contact with the said flange by the tension of the spring 78, controlling the said crescent arm, and since when the basket shield is in its lower position the lever 72 is in the inclined position shown in Fig. 1 and is above the crescent arm 74 the said arm and consequently the gear 73 are turned by the frictional contact of the roller on the clutch 91, and motion is communicated through the gear 81 to the sprocket-wheel on the end of the drive-shaft of the bundle-carrier; but when the basket shield has been raised up a predetermined distance by the mass of material fed inward by the bundle-carrier the trip-arm 70 will raise the end of the lever 72, which rests upon it, and will depress the opposite end of the lever, bringing the said depressed end opposite the free end of the crescent arm 74 on the gear 73, as is shown in Fig. 5, and as the said gear seeks to further revolve the free end of the crescent arm will be forced outward and will be held in an outer position, placing the spring 78 under tension and permitting the rollers 92 on the clutch-disk 91 to move without interfering with the flange 75, thus stopping the rotation of the gear 73, and consequently the rotation of the drive-shaft of the bundle-carrier. The moment, however, that the basket shield drops to its normal position the lever 72 will be carried out of engagement with the crescent arm 74 of the gear 73, and the spring 78 will immediately act to bring the flange portion of said arm again in clamping engagement with the rollers of the clutch-disk 91, and the said gear 73 will be again revolved and motion will be again communicated to the drive-shaft of the bundle-carrier.

Having thus described my invention, I claim as new and desire to secure by Letters Patent—

1. In a feeder for threshing-machines, a feed-roller, a basket shield in which the roller revolves, the shield having movement to and from the roller, a support above the roller, a shaft mounted upon said support and provided with crank-arms at its ends, upper end sections for the shield with which the crank-arms have sliding engagement whereby to insure the shield being evenly raised, means for regulating the pressure required to raise the shield, a bundle-carrier having its delivery end beneath the shield, a driving mechanism for the bundle-carrier, and means for stopping and starting said driving mechanism and controlled by the movement of the shield to and from the feed-roller, substantially as set forth.

2. In a feeder for threshing-machines, a feed-roller provided with teeth, a basket shield in which the roller revolves, which shield is mounted for movement to and from the said roller, the said shield consisting of spaced transversely-arranged substantially U-shaped slats, connecting-bars for the upper ends of the slats, arched cross-bars at each end of the shield extending from the front to the rear of the same at the upper portion thereof, and provided with extensions pivoted to the frame of the machine, a support for the shield engaging the arched cross-bars, and arranged to insure the shield being evenly raised, a cross-bar at the top of the shield between the end cross-bars, a pivoted regulating-arm connected at one end by a link with the said cross-bar, the other end of the arm being provided with an adjustable weight for regulating the amount of pressure required to raise the shield, as set forth.

3. In a feeder for threshing-machines, a toothed feed-roller, a slatted basket shield in which the roller revolves, the shield having movement to and from the roller, a support above the roller, a shaft mounted upon said support and provided with crank-arms at its ends, upper end sections for the shield, having slots in which the crank-arms have sliding movement, whereby to insure the shield being evenly raised, and means for regulating the pressure required to raise the shield, substantially as set forth.

4. In a feeder for threshing-machines, a feed-roller, a shield for the feed-roller in which the said roller revolves, said shield being mounted for movement to and from the feed-roller, a bundle-carrier having its delivery end beneath the shield, a driving mechanism for the bundle-carrier, a driving mechanism for the feed-roller, a clutch connection between the two sets of driving mechanisms, whereby the bundle-carrier is driven from the feed-roller shaft, a pivoted and spring-controlled crescent arm forming part of said clutch mechanism, a trip-lever adapted to engage the free end of said crescent arm to move the same against the tension of its spring, and a trip-arm carried by the shield and having a foot on which the longer and heavier end of said trip-lever rests, the said trip-arm being operated by the movement of the shield to and from the feed-roller, whereby the driving mechanism of the bundle-carrier is automatically stopped when the shield is raised a predetermined distance and is started when the shield drops to its normal position.

5. In a feeder for threshing-machines, a feed-roller, a shield for the feed-roller in which the said roller revolves, said shield being mounted for movement to and from the feed-roller, a bundle-carrier having its delivery end beneath the shield, a driving mechanism for the feed-roller, a gear loosely mounted on the shaft of the feed-roller, a driving connection between the said gear and the bundle-carrier, a crescent-shaped arm pivoted on the said gear and having a segmental flange formed at its outer marginal portion and extending from a point near its pivot to the opposite end of the arm, the said flange being provided between its ends with an inwardly-extending angular projection forming pockets at each side of the projection, a spring normally holding the flange portion of the crescent arm within the line of teeth of the said gear, a clutch-disk secured to the shaft of the feed-roller and provided with diametrically opposite rollers adapted to enter either one of the pockets formed in the flange of the crescent arm and to be held in frictional contact with the flange by the tension of the spring controlling the crescent arm, whereby motion is communicated from the shaft of the feed-roller to the said gear-wheel and the bundle-carrier, a lever adapted to be moved into the path of the crescent arm to engage the same and move the said arm against the tension of its spring to carry the flange out of engagement with the rollers on the clutch-disk, and thereby stop the movement of the said gear-wheel and the bundle-carrier, the end of the said lever being normally out of the path of the said crescent arm, and a trip-arm carried by the shield and engaging the said lever to move the lever into operative position when the shield is raised a predetermined distance, as set forth.

In testimony whereof I have signed my name to this specification in the presence of two subscribing witnesses.

WALFERD C. PETERSON.

Witnesses:
  E. J. BARBUR,
  U. F. STANARD.